US010008901B2

(12) United States Patent
Yeo et al.

(10) Patent No.: US 10,008,901 B2
(45) Date of Patent: Jun. 26, 2018

(54) STEP MOTOR

(71) Applicant: MOATECH CO., LTD., Incheon (KR)

(72) Inventors: Woo-Seok Yeo, Incheon (KR);
Seong-Kwan Oh, Incheon (KR);
Hyun-Ki Yang, Incheon (KR);
Hong-Min Jang, Incheon (KR)

(73) Assignee: MOATECH CO., LTD., Incheon (KR)

( * ) Notice: Subject to any disclaimer, the term of this patent is extended or adjusted under 35 U.S.C. 154(b) by 317 days.

(21) Appl. No.: 14/835,712

(22) Filed: Aug. 26, 2015

(65) Prior Publication Data
US 2016/0065042 A1 Mar. 3, 2016

(30) Foreign Application Priority Data

Aug. 27, 2014 (KR) .................. 10-2014-0112530

(51) Int. Cl.
*H02K 37/00* (2006.01)
*H02K 5/22* (2006.01)
*H02K 11/00* (2016.01)
*H02K 37/14* (2006.01)
*H02K 3/52* (2006.01)
*H02K 11/215* (2016.01)

(52) U.S. Cl.
CPC .............. *H02K 5/225* (2013.01); *H02K 3/525* (2013.01); *H02K 11/0021* (2013.01); *H02K 11/215* (2016.01); *H02K 37/14* (2013.01)

(58) Field of Classification Search
CPC ...... H02K 5/225; H02K 11/215; H02K 37/14; H02K 3/525
USPC ...................................... 310/49.01
See application file for complete search history.

(56) References Cited

U.S. PATENT DOCUMENTS

| 5,844,394 | A  | * | 12/1998 | Mushika ............... H02P 8/14 318/685 |
| 6,921,995 | B2 | * | 7/2005  | Nishimura ............ H02K 1/145 310/49.01 |
| 7,866,864 | B2 | * | 1/2011  | Hsu ................... F16H 25/2015 310/49.01 |
| 8,604,647 | B2 | * | 12/2013 | Hu ...................... H02K 41/031 310/12.18 |
| 9,135,946 | B1 | * | 9/2015  | Yang .................. G11B 19/2009 |

(Continued)

FOREIGN PATENT DOCUMENTS

| JP | 2001086724 A | 3/2001 |
| JP | 2011055598 A | 3/2011 |

(Continued)

OTHER PUBLICATIONS

Korean Notice of Allowance dated Aug. 29, 2016 for Korean Application No. 10-2014-0112530, citing the above reference(s).

(Continued)

*Primary Examiner* — Forrest M Phillips
(74) *Attorney, Agent, or Firm* — Hauptman Ham, LLP (57) ABSTRACT

Disclosed herein is a step motor. The step motor includes a casing, a stator disposed in the casing, with a coil being wound around the stator, a rotor disposed in the stator, having a rotor shaft that is rotatably supported at both ends of the casing, and rotated by interaction with the stator, a rotary sensing unit provided in the casing to detect a rotation of the rotor, and a coil connector formed on an outer surface of the stator, with an end of the coil being connected to the coil connector.

9 Claims, 13 Drawing Sheets

(56) References Cited

U.S. PATENT DOCUMENTS

2008/0084131 A1*  4/2008  Yamawaki ............... H02K 5/08
                                                    310/89
2008/0164784 A1*  7/2008  Huang ..................... H02K 5/08
                                                    310/49.01

FOREIGN PATENT DOCUMENTS

| KR | 20040065612 A | 7/2004 |
| KR | 20110002937 A | 1/2011 |
| KR | 10-2011-0099827 A | 9/2011 |

OTHER PUBLICATIONS

Korean Office Action dated Dec. 11, 2015 in connection with the counterpart Korean Patent Application No. 10-2014-0112530, citing the above reference(s).

* cited by examiner

STEP MOTOR

CROSS REFERENCE TO RELATED APPLICATION

This application claims the benefit of Korean Patent Application No. 10-2014-0112530, filed on Aug. 27, 2014, entitled "STEP MOTOR", which is hereby incorporated by reference in its entirety into this application.

BACKGROUND OF THE INVENTION

1. Field of the Invention

The present invention generally relates to a step motor. More particularly, the present invention relates to step motor, which is capable of increasing the reliability and the extendability of the motor.

2. Description of the Related Art

Generally, a PM (permanent magnet) type step motor is composed of a rotor to which a magnet is attached, and a stator which is provided on an outer circumference of the magnet to be spaced apart therefrom by a predetermined distance, so that the step motor is rotated in response to an external electric signal applied to the stator.

The step motor includes the rotor and the stator, with a casing provided on an outer circumference of the stator to protect and cover the stator.

The rotor includes the magnet having a plurality of N- and S-poles that are alternately magnetized on an outer circumference of a rotating shaft, and is inserted into an inner radius portion of the stator.

The stator is composed of a bobbin that accommodates the coil therein, and yokes that are inserted into an inner radius portion of the bobbin and have a plurality of yoke teeth. The yokes are configured such that the plurality of yoke teeth formed on the yokes face and engage with each other.

The step motor is configured such that the magnet passes through the yoke teeth that engage with each other, and thereby the rotor rotates as external power is applied to the stator.

In the case of implementing a precision position control in communication equipment using the step motor configured as such, a coil connection terminal protruding perpendicularly from a shaft of the step motor causes installation space to be increased, and makes it difficult to be assembled with a counterpart.

As the cited document related to the present invention, Korean Patent Laid-Open Publication No. 10-2011-0002937 (laid open on Jan. 11, 2011) has been proposed.

SUMMARY OF THE INVENTION

Accordingly, the present invention has been made keeping in mind the above problems occurring in the related art, and an object of the present invention is to provide a step motor, which accommodates therein a rotary sensing unit to check an output value of the motor in response to a feedback signal of a rotor, thus increasing the reliability of the motor.

Another object of the present invention is to provide a step motor, in which a coil connection terminal is formed in a bobbin of a stator to be located in a casing, thus reducing a volume of the step motor itself and ensuring assemblability with a counterpart and extendability.

In order to achieve the above objects, according to one aspect of the present invention, there is provided a step motor, including a casing; a stator disposed in the casing, with a coil being wound around the stator; a rotor disposed in the stator, having a rotor shaft that is rotatably supported at both ends of the casing, and rotated by interaction with the stator; a rotary sensing unit provided in the casing to detect a rotation of the rotor; and a coil connector formed on an outer surface of the stator, with an end of the coil being connected to the coil connector.

The coil connector may include at least one coil connection terminal.

Preferably, the coil connection terminal may be located in the casing and may be formed on an outer surface of the stator to protrude in a direction perpendicular to the rotor shaft.

The stator may include on an outer surface thereof a pair of flat surfaces that are symmetrical with respect to a center of the stator.

The coil connection terminal may be formed on each of the pair of flat surfaces.

Preferably, a pair of coil connection terminals may be formed on each of the pair of flat surfaces to be spaced apart from each other by a preset distance.

Preferably, the coil connection terminal may be spaced apart from an inner circumference of the casing.

Preferably, at least one coil-removal-preventing member may be provided on each of the pair of flat surfaces to fix a coil arrangement path.

Preferably, a through hole or a groove that may be opened at a side thereof may be formed in the coil-removal-preventing member so that the coil may be inserted into the through hole or the groove.

Preferably, the rotary sensing unit may be provided in the casing, and may detect a polarity of a permanent magnet provided on the rotor as the rotor may be rotated, thus detecting a rotating direction and a number of rotations of the rotor.

The rotary sensing unit may include a plurality of magnets having different polarities and provided on a side in the casing to be spaced apart from each other in a circumferential direction about the rotor shaft; a magnetic sensor provided on a side in the casing and measuring a magnetic force from any one of the plurality of magnets; and a circuit module equipped with the magnetic sensor, and detecting the rotating direction and the number of rotations of the rotor, based on a measured magnetic force, to output them to an outside.

Further, the casing may include a casing body having a hollow shape that is open at a first side thereof, with the stator disposed in the casing body, and a seal cover provided on a second side of the casing body.

A magnet holder may be provided on an inner surface of the seal cover to rotatably support the rotor shaft, and may be equipped with a plurality of magnets.

A circuit portion may be disposed between the magnet holder and an inner surface of the seal cover.

Preferably, the circuit portion may include a cable passing through the seal cover in such a way as to extend to the outside, and a connector provided on an end of the cable.

As is apparent from the above description, the step motor is advantageous in that it accommodates a rotary sensing unit to check an output value of the motor in response to a feedback signal of a rotor, thus increasing the reliability of the motor.

Further, the step motor according to the present invention is advantageous in that a coil connection terminal is formed in a stator bobbin to be located in a casing, thus reducing a volume of the step motor itself and ensuring assemblability with a counterpart and extendability.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Hereinafter, a step motor according to the present invention will be described with reference to the accompanying drawings.

Figure 1:
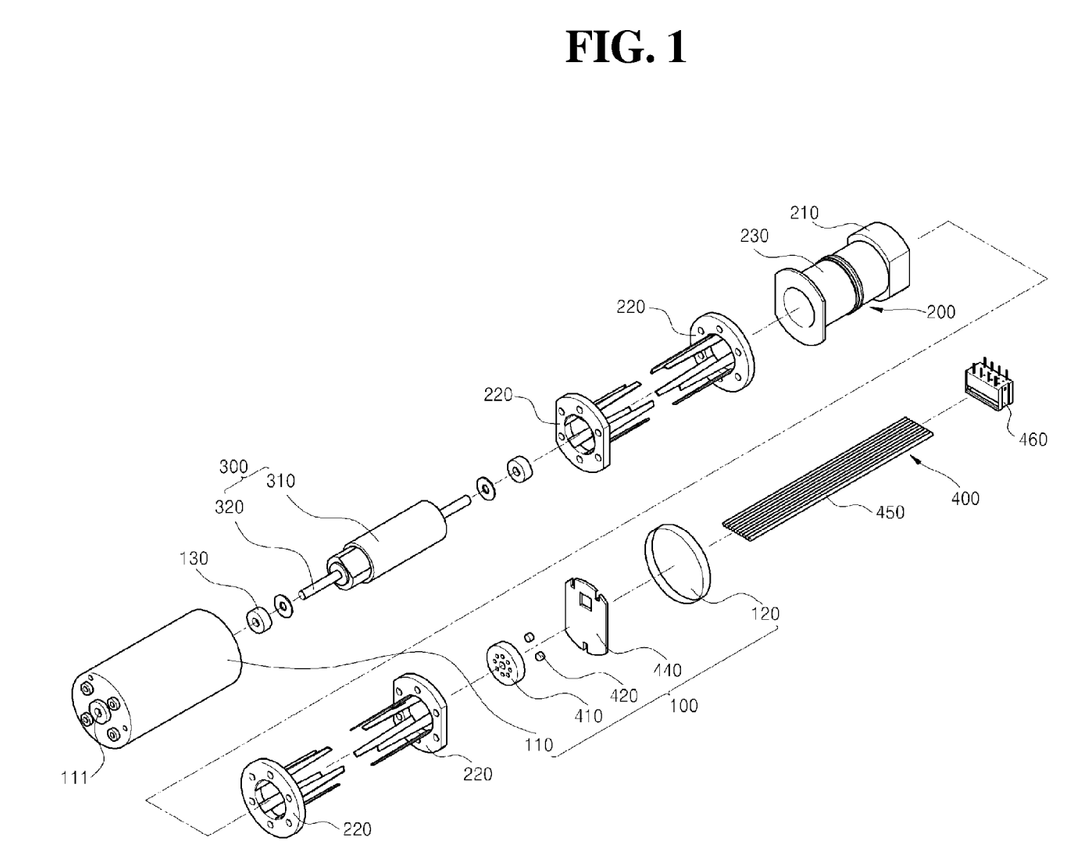
FIG. 1 is an exploded perspective view illustrating a step motor according to the present invention.
Figure 2:
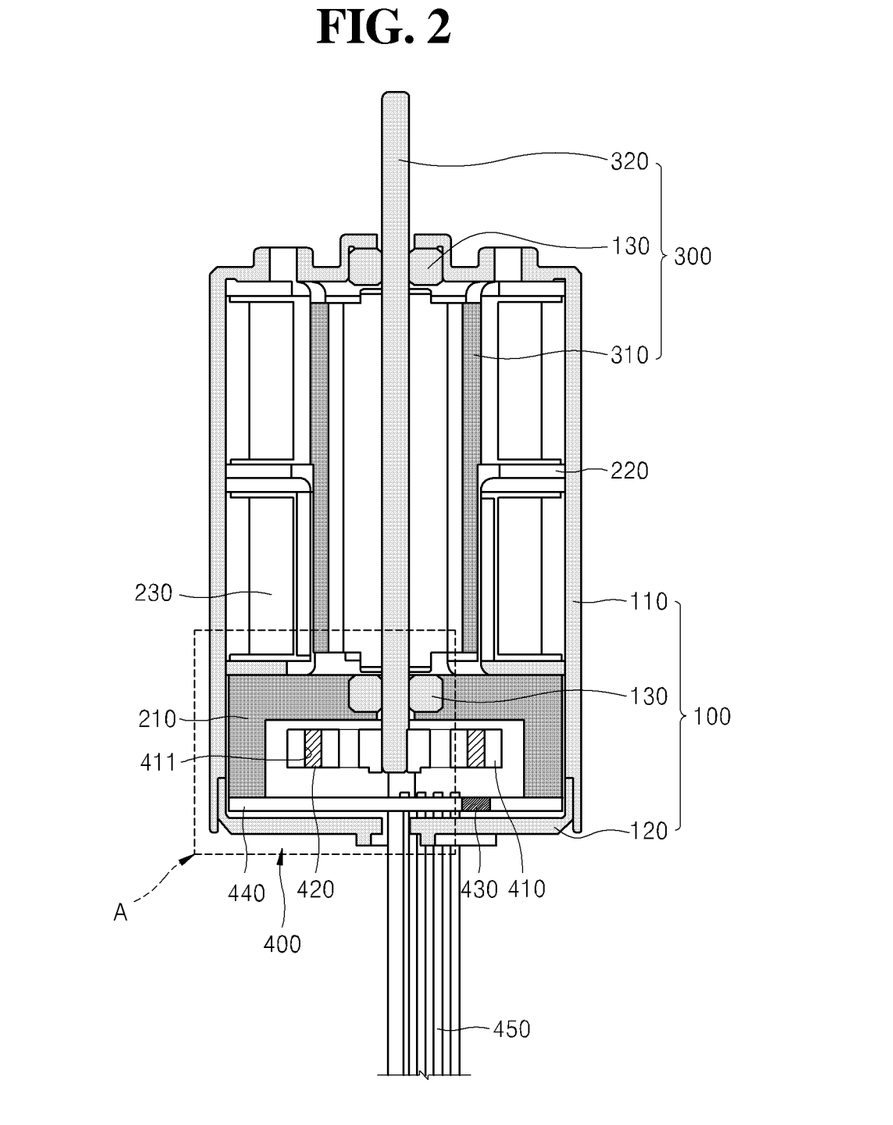
FIG. 2 is a sectional view illustrating the step motor according to the present invention.

FIG. 1 is an exploded perspective view illustrating a step motor according to the present invention, and FIG. 2 is a sectional view illustrating the step motor according to the present invention.

Referring to FIGS. 1 and 2, the step motor of the present invention mainly includes a casing 100, a stator 200, a rotor 300, a rotary sensing unit 400, and a coil connector 500.

Casing 100

The casing 100 is composed of a casing body 110 and a seal cover 120.

The casing body 110 is opened at one side thereof, and defines a space therein, with a rotor-shaft passing hole 111 formed in a predetermined position of the casing body 110.

The seal cover 120 may be provided on the other side of the casing body 110.

The seal cover 120 is screwed onto or press-fitted into the other side of the casing body 110, thus sealing an internal space of the casing body 110.

Stator 200

The stator 200 may be inserted into the casing body 110.

The stator 200 is composed of a bobbin 210, a yoke 220, and a coil 230.

A pair of yokes 220 is provided in such a way that yoke teeth engage with each other.

Each yoke 220 formed as such is coupled to a side of the bobbin 210 to abut against it. The coil is wound around the bobbin 210.

Rotor 300

The rotor 300 is disposed to be inserted into the above-described bobbin 210.

The rotor 300 is provided with permanent magnets 310 that are magnetized by different poles.

A rotor shaft 320 is installed to pass through the permanent magnet 310.

The permanent magnet 310 may be rotated by an electromagnetic interaction with the stator 200.

One end of the rotor shaft 320 passes through the rotor-shaft passing hole 111 formed in a center of one side of the casing 100, while the other end of the rotor shaft 320 passes through the other side of the bobbin 210 to be rotatably supported.

In this regard, a pair of bushings 130 is fitted into both ends of the rotor shaft 320 to guide a rotation.

Coil Connector 500

Figure 3:
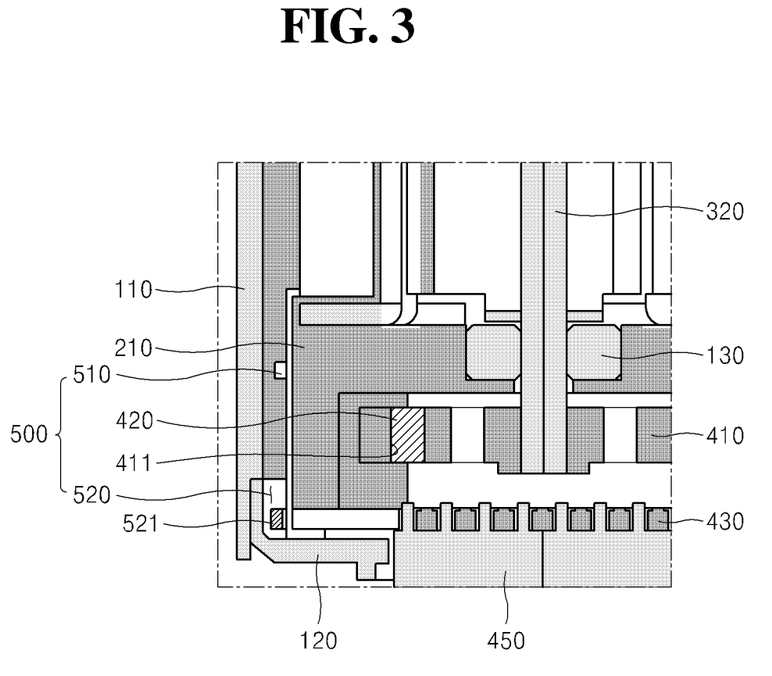
FIG. 3 is an enlarged sectional view illustrating portion shown by reference character A of FIG. 2.
Figure 4:
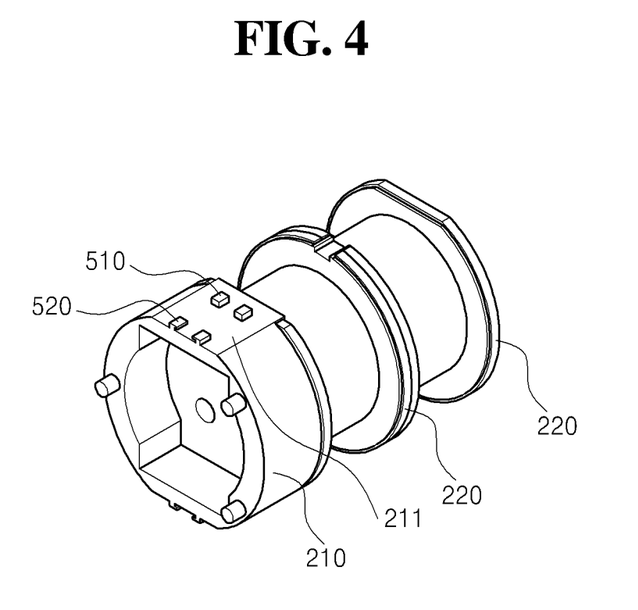
FIG. 4 is a perspective view illustrating a stator according to the present invention.
Figure 5:
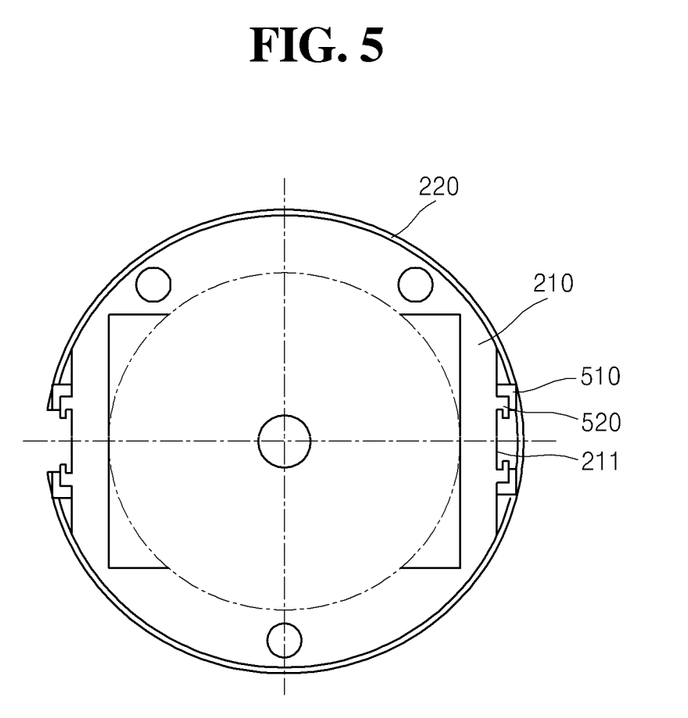
FIG. 5 is a front view illustrating the stator according to the present invention.
Figure 6:
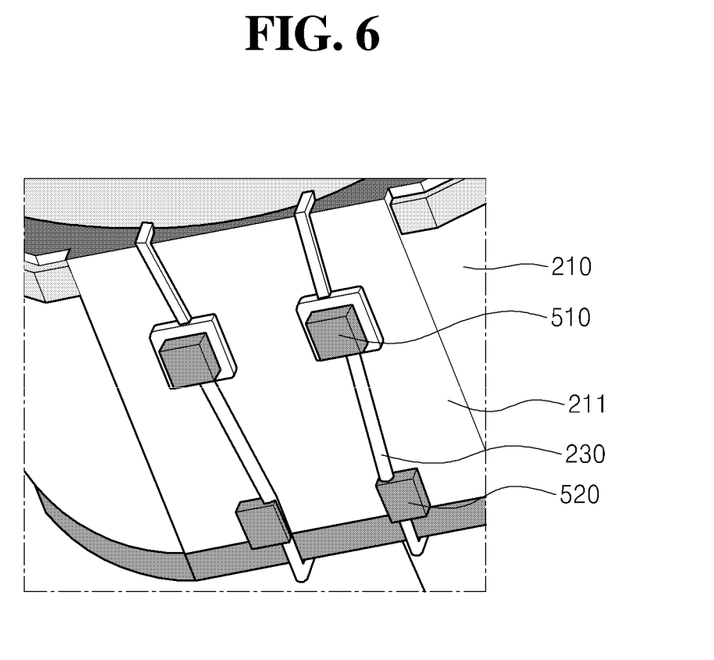
FIG. 6 is a perspective view illustrating a coil connector according to the present invention.

FIG. 3 is an enlarged sectional view illustrating portion shown by reference character A of FIG. 2, FIG. 4 is a perspective view illustrating the stator according to the present invention, FIG. 5 is a front view illustrating the stator according to the present invention, and FIG. 6 is a perspective view illustrating the coil connector according to the present invention.

Referring to FIGS. 3 to 5, the coil connector 500 according to the present invention includes at least one coil connection terminal 510.

The coil connection terminal 510 is formed on an outer surface of the bobbin 210. Coil connection terminals 510 are formed to be symmetric with respect to the center of the bobbin 210.

Here, a pair of flat surfaces 211 is formed on both sides of an outer surface of the bobbin 210. The pair of flat surfaces 211 may be injection-molded to form a plane.

Since the flat surfaces 211 are formed on the outer surface of the bobbin 210 as such, a region in which the flat surfaces 211 are formed defines a predetermined space with an inner surface of the casing body 110.

The coil connection terminal 510 is formed in the shape of a square pillar. A pair of coil connection terminals protrudes from each of the pair of flat surfaces 211.

The coil connection terminals 510 formed on each of the flat surfaces 211 are spaced apart from each other by a preset distance in the direction of the rotor shaft 320.

The coil connection terminals 510 protrude from each flat surface 211 in a direction perpendicular to the rotor shaft 320.

Preferably, each of the coil connection terminals 510 may be spaced apart from the inner surface of the casing body 110.

Here, the coil 230 wound around the bobbin 210 may be connected to the coil connection terminals 510 in a winding manner.

Thus, the above-described structure according to the present invention allows the coil connection terminals 510 to protrude from the outer surface of the bobbin 210 while being located in the casing body 110, thus reducing the size of the motor itself.

Meanwhile, referring to FIGS. 4 to 6, a coil-removal-preventing member 520 protrudes from each of the pair of flat surfaces 211 formed on both sides of the outer surface of the bobbin 210.

A pair of coil-removal-preventing members 520 is formed on each flat surface 211.

Preferably, the coil-removal-preventing member 520 may be formed to correspond to the number of the coil connection terminals 510.

The arranging path of the coil 230 connected to and extending from each coil connection terminal 510 may be secured by the coil-removal-preventing member 520.

Figure 7:
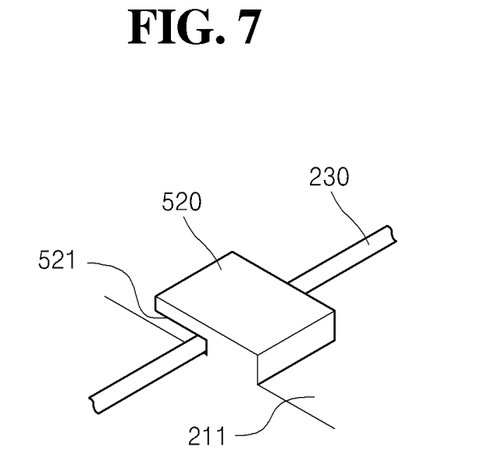
FIG. 7 is a perspective view illustrating a coil-removal-preventing member according to the present invention.

FIG. 7 is a perspective view illustrating the coil-removal-preventing member according to the present invention.

Referring to FIG. 7, the coil-removal-preventing member 520 according to the present invention may be an 'L'-shaped member having a groove 521 that is open at a side thereof.

The groove 521 serves to guide and secure the coil arranging path, with the coil 230 inserted into the groove 521.

Figure 8:
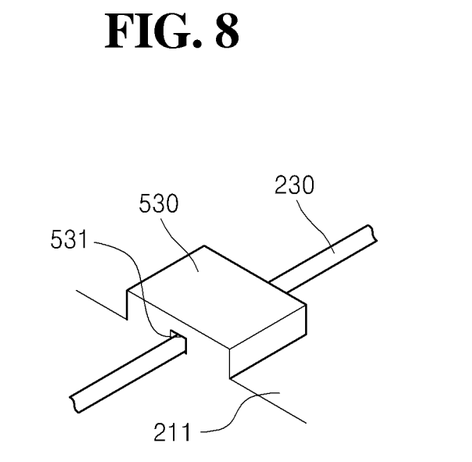
FIG. 8 is another perspective view illustrating the coil-removal-preventing member according to the present invention.

FIG. 8 is another perspective view illustrating the coil-removal-preventing member according to the present invention.

Further, referring to FIG. 8, the coil-removal-preventing member 530 according to the present invention may be a '☐'-shaped member having a through hole 531.

The through hole 531 serves to guide and secure the coil arranging path, with the coil 230 passing through the through hole 531.

Therefore, according to the present invention, the arranging path of the coil 230 connected to and extending from the coil connection terminal 510 is secured by an additional coil-removal-preventing member 530, thus efficiently preventing the coil from being removed from the coil connection terminal 510.

Further, the arranging path of the coil 230 is secured by the groove 521 or the through hole 531 of the coil-removal-preventing member 520, 530, thus preventing the coil 230 from coming off, and structurally solving a problem wherein the coil comes into contact with the inner surface of the casing body 110.

Rotary Sensing Unit 400

Figure 9:
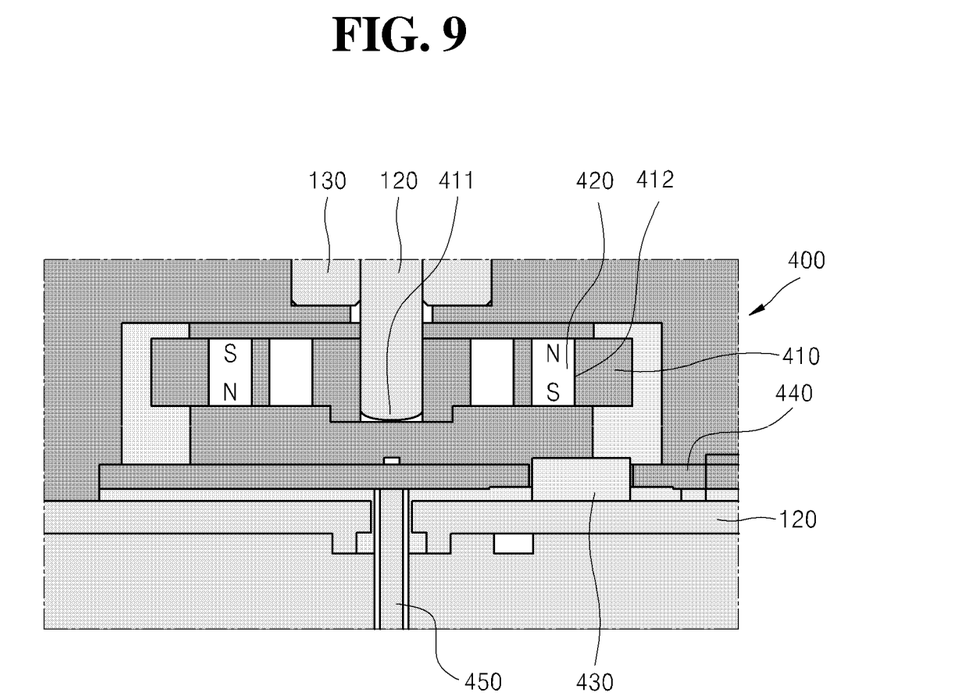
FIG. 9 is a sectional view illustrating the arrangement of a rotary sensing unit according to the present invention.

FIG. 9 is a sectional view illustrating the arrangement of the rotary sensing unit according to the present invention.

Referring to FIG. 9, the rotary sensing unit 400 according to the present invention is embedded in the casing body 110.

Preferably, the rotary sensing unit 400 is disposed on the other side of the casing body 110.

The rotary sensing unit 400 includes a magnet holder 410, a magnet 420, a magnetic sensor 430, and a circuit module 440.

The magnet holder 410 is provided on an inner surface of the above-described seal cover 120.

The circuit module 440 is equipped with the magnetic sensor 430, and is installed to be positioned between the magnet holder 410 and the seal cover 120.

The magnetic sensor 430 is installed at a position corresponding to any one of magnets 420 that will be described below.

The magnet holder 410 is disposed in the casing body 110 to be located at one side of the bobbin 210.

The magnet holder 410 is formed in the shape of a disc, and a rotary hole 411 is formed in the center of the magnet holder 410 to rotatably support the other end of the rotor shaft 320.

A plurality of mounting holes 412 is circumferentially formed in the magnet holder 410 while being at a position having a predetermined radius from the rotary hole 411 as a center.

The magnet 420 is fixedly fitted into each of the plurality of mounting holes 412.

The magnet 420 is magnetized by N- and S-poles.

Figure 10:
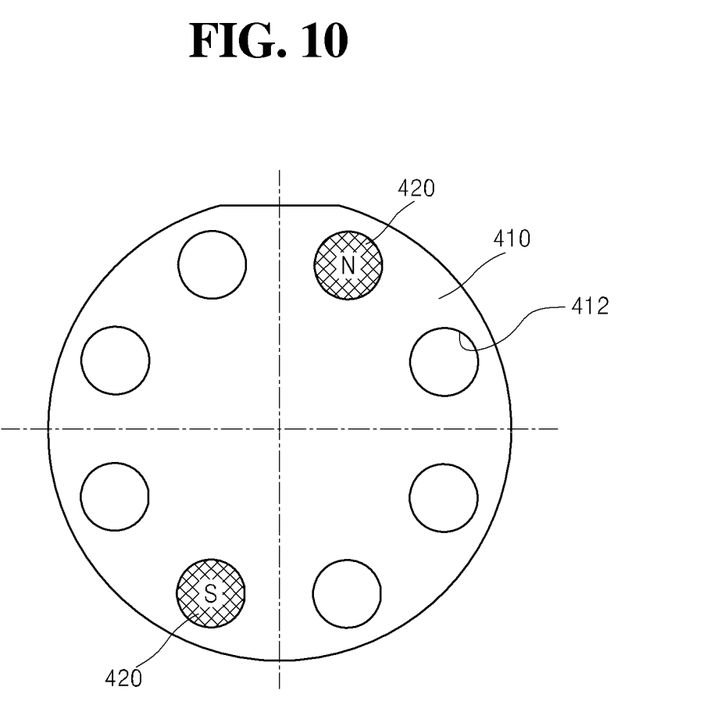
FIG. 10 is a sectional view illustrating the arrangement of magnets according to the present invention.

FIG. 10 is a sectional view illustrating the arrangement of the magnets according to the present invention.

As shown in FIGS. 9 and 10, a plurality of magnets 420 fitted into the plurality of mounting holes 412, respectively is disposed such that different polarities alternate with each other in the circumferential direction.

Figure 11:
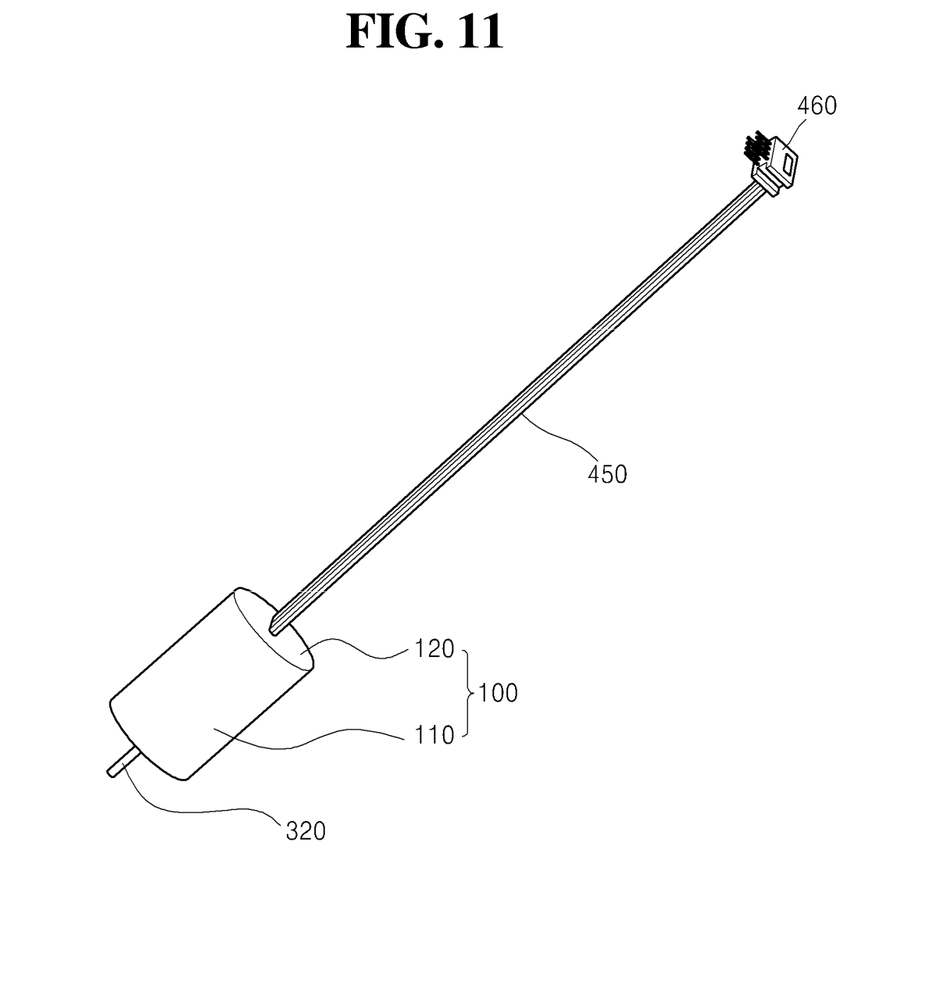
FIG. 11 is a view illustrating a casing to which a cable according to the present invention is externally connected.
Figure 12:
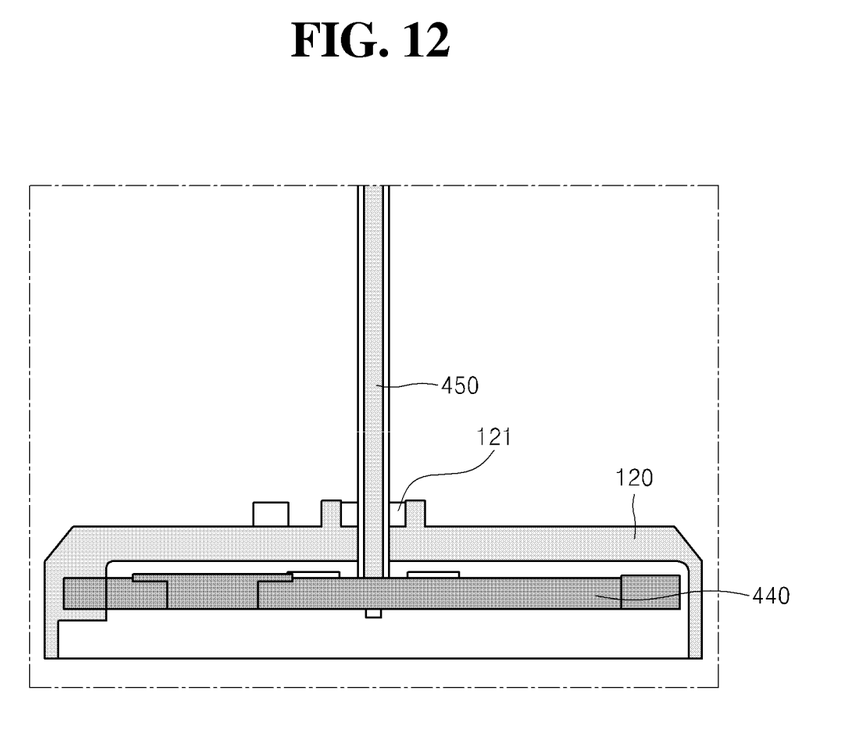
FIG. 12 is a sectional view illustrating an example wherein the cable is connected to a circuit module according to the present invention.

FIG. 11 is a view illustrating a casing to which a cable according to the present invention is externally connected, and FIG. 12 is a sectional view illustrating an example wherein the cable is connected to a circuit module according to the present invention.

Referring to FIG. 11, the above-described rotary sensing unit 400 further includes a cable 450 and a connector 460.

As shown in FIG. 12, one end of the cable 450 is connected to the circuit module 440.

Here, a cable passing hole 121 is formed in the seal cover 120 so that the cable 450 passes through the cable passing hole 121 and extends to an outside.

Further, the connector 460 is provided on the other end of the cable 450. The connector 460 is used to be electrically connected with a counterpart.

Figure 13:
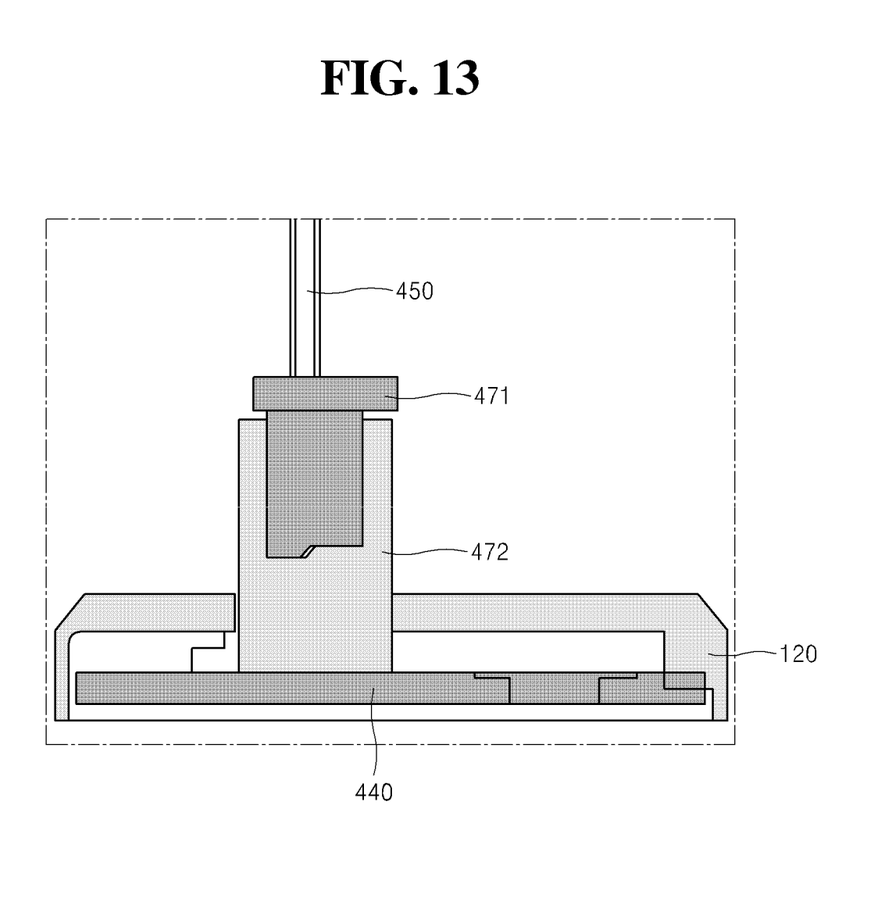
FIG. 13 is a sectional view illustrating another example wherein the cable is connected to the circuit module according to the present invention.

FIG. 13 is a sectional view illustrating another example wherein the cable is connected to the circuit module according to the present invention.

Further, as shown in FIG. 13, a first connector 471 may be provided on one end of the cable 450.

Moreover, a second connector 472 may be provided on the circuit module 440. The second connector 472 may be electrically connected to the circuit module 440 to protrude to the outside of the seal cover 120.

Therefore, the first and second connectors 471 and 472 are coupled to each other, thus allowing the circuit module 440 and the cable 450 to be electrically connected to each other.

Through such a configuration, the magnetic sensor 430 of the rotary sensing unit 400 installed in the casing 100 detects a change in magnetic force between the permanent magnet 310 and the magnets 420 varying as the rotor 300 rotates, and detects the rotating speed and the rotating direction of the rotor shaft 320, thus transmitting an electric signal pertaining thereto through the above-described cable 450 to the outside.

In the above-described configuration and operation according to the embodiment of the present invention, the rotary sensing unit is installed in the casing, an output value of the motor is checked via a feedback signal of the rotor and then is transmitted through the cable to the outside, so that the volume of the motor itself is reduced and the rotating speed and the rotating direction of the rotor shaft are immediately output. As a result, it is possible to increase the reliability of the motor.

Further, according to the embodiment of the present invention, the coil connection terminals to which the coil wound around the stator is connected are formed on the outer surface of the bobbin while being disposed in the casing, thus reducing the volume of the step motor itself and enhancing the assemblability with a counterpart.

Furthermore, according to the embodiment of the present invention, the coil-removal-preventing member for securing the coil to a predetermined position is formed on the outer surface of the bobbin, thus preventing the coil from coming into contact with the inner surface of the casing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention is not limited by any of the details of description, and the scope of the invention is to be determined solely by the following claims and equivalents thereof.

It should be understood that the present embodiment is illustrative and not restrictive, and the scope of the invention is defined by the following claims rather than by the description preceding them, and all changes that fall within meets and bounds of the claims, or equivalence of such meets and bounds are intended to be embraced by the claims.

What is claimed is:

1. A step motor, comprising:
a casing having an opening at first side;
a stator disposed in the casing, with a coil being wound around the stator;
a rotor disposed in the stator, having a rotor shaft that is rotatably supported at both ends of the casing, and rotated by interaction with the stator;
a rotary sensing unit provided in the casing to detect a rotation of the rotor; and
a coil connector integrally formed on an outer surface of the stator, with an end of the coil being connected to the coil connector, and
wherein
the coil connector is spaced from an inner circumferential surface of the casing,
the coil connector is disposed between the opening and the coil,
the coil is disposed along a same axis in the coil connector,
the coil connector comprises at least one coil connection terminal,
the stator comprises on an outer surface thereof a pair of flat surfaces that are symmetrical with respect to a center of the stator and the coil connection terminal is formed on each of the pair of flat surfaces,
the pair of flat surfaces is formed by cutting a part of the circular circumference of the stator, and
the coil connection terminal is formed on the pair of flat surfaces or around the circular circumference.

2. The step motor as set forth in claim 1, wherein the coil connection terminal is located in the casing and is formed on an outer surface of the stator to protrude in a direction perpendicular to the rotor shaft.

3. The step motor as set forth in claim 1, wherein a pair of coil connection terminals is formed on each of the pair of flat surfaces to be spaced apart from each other by a preset distance.

4. The step motor as set forth in claim 3, wherein the coil connection terminal is spaced apart from an inner circumference of the casing.

5. The step motor as set forth in claim 1, wherein at least one coil-removal-preventing member is provided on each of the pair of flat surfaces to fix a coil arrangement path.

6. The step motor as set forth in claim 5, wherein a through hole or a groove that is opened at a side thereof is formed in the coil-removal-preventing member so that the coil is inserted into the through hole or the groove.

7. The step motor as set forth in claim 1, wherein the rotary sensing unit is provided in the casing, and detects a polarity of a permanent magnet provided on the rotor as the rotor is rotated, thus detecting a rotating direction and a number of rotations of the rotor.

8. The step motor as set forth in claim 7, wherein the rotary sensing unit comprises:
a plurality of magnets having different polarities, and provided on a side in the casing to be spaced apart from each other in a circumferential direction about the rotor shaft;
a magnetic sensor provided on a side in the casing, and measuring a magnetic force from any one of the plurality of magnets; and
a circuit module equipped with the magnetic sensor, and detecting the rotating direction and the number of rotations of the rotor, based on a measured magnetic force, to output them to an outside.

9. The step motor as set forth in claim 8, wherein the casing comprises:
a casing body having a hollow shape that is open at a first side thereof, with the stator disposed in the casing body;
a seal cover provided on a second side of the casing body;
a magnet holder provided on an inner surface of the seal cover, rotatably supporting the rotor shaft, and equipped with a plurality of magnets; and
a circuit portion disposed between the magnet holder and an inner surface of the seal cover, and comprising:
a cable passing through the seal cover in such a way as to extend to the outside; and
a connector provided on an end of the cable.

* * * * *